(12) United States Patent
Lin et al.

(10) Patent No.: US 12,223,745 B1
(45) Date of Patent: Feb. 11, 2025

(54) PAVEMENT ELEMENT ANNOTATION METHOD FOR POINT CLOUD DATA WITH FUSION OF HEIGHT, DEVICE FOR CONSTRUCTING AND PRE-ANNOTATION POINT CLOUD DATA WITH FUSION OF HEIGHT, ELECTRONIC DEVICE AND COMPUTER-READABLE STORAGE MEDIUM

(71) Applicant: Molar Intelligence (Hangzhou) CO., LTD., Zhejiang (CN)

(72) Inventors: Qunshu Lin, Zhejiang (CN); Minghao Liu, Zhejiang (CN); Shigang Qi, Zhejiang (CN); Xinjun Wu, Zhejiang (CN); Yi Yang, Zhejiang (CN); Chao Zhang, Zhejiang (CN); Zijian Zhao, Zhejiang (CN); Qijun Shao, Zhejiang (CN)

( * ) Notice: Subject to any disclaimer, the term of this patent is extended or adjusted under 35 U.S.C. 154(b) by 0 days.

(21) Appl. No.: 18/653,908

(22) Filed: May 2, 2024

(51) Int. Cl.
| | |
|---|---|
| G06V 20/56 | (2022.01) |
| G06T 7/20 | (2017.01) |
| G06T 17/00 | (2006.01) |
| G06V 10/44 | (2022.01) |
| G06V 10/771 | (2022.01) |
| G06V 20/70 | (2022.01) |

(52) U.S. Cl.
CPC .............. *G06V 20/588* (2022.01); *G06T 7/20* (2013.01); *G06T 17/00* (2013.01); *G06V 10/44* (2022.01); *G06V 10/771* (2022.01); *G06V 20/70* (2022.01); *G06T 2207/30241* (2013.01); *G06V 2201/07* (2022.01)

(58) Field of Classification Search
CPC .... G06V 20/588; G06V 20/70; G06V 10/771; G06V 10/44; G06T 7/20; G06T 17/00
See application file for complete search history.

(56) References Cited

U.S. PATENT DOCUMENTS

| 11,069,133 B2* | 7/2021 | Yan ...................... G01S 7/4802 |
| 11,580,328 B1* | 2/2023 | Ho ........................ G06V 10/774 |
| 2020/0257901 A1* | 8/2020 | Walls ...................... G01S 17/89 |
| 2023/0271607 A1* | 8/2023 | Kobashi .................. G01S 17/89 |
| | | 701/41 |

* cited by examiner

Primary Examiner — James M Anderson, II
(74) Attorney, Agent, or Firm — Hawaii Patent Services; Nathaniel K. Fedde; Kenton N. Fedde

(57) ABSTRACT

The present invention discloses a pavement element annotation method for point cloud data with fusion of height, which comprises the following steps: constructing all single-frame point clouds into a joint point cloud in a global coordinate system based on the pose of each frame of single-frame point cloud; removing dynamic objects in the joint point cloud to obtain a static joint point cloud; transforming the static joint point cloud into an overhead image; pre-annotating the pavement elements in an overhead image by using the pavement element pre-annotation model; modifying the pre-annotated result to obtain an overhead image annotation; based on a ball query algorithm and a ground point algorithm, establishing a transformational relation between the pixels of the overhead image and the points of the static joint point cloud; transforming the overhead image annotation into a static joint point cloud annotation based on the transformational relation.

20 Claims, 3 Drawing Sheets

PAVEMENT ELEMENT ANNOTATION METHOD FOR POINT CLOUD DATA WITH FUSION OF HEIGHT, DEVICE FOR CONSTRUCTING AND PRE-ANNOTATION POINT CLOUD DATA WITH FUSION OF HEIGHT, ELECTRONIC DEVICE AND COMPUTER-READABLE STORAGE MEDIUM

TECHNICAL FIELD

The present invention relates to the technical field of data annotation, in particular to a pavement element annotation method for point cloud data with fusion of height and a device for constructing and pre-annotation point cloud data with fusion of height.

BACKGROUND

The development of modern high-tech technologies such as autonomous driving and unmanned aerial vehicles depends on high-precision point cloud data, especially the information of pavement elements. Therefore, it is very important to construct an accurate method of pavement element identification and annotation. However, the conventional annotation method of pavement elements needs professional manual work, which is time-consuming and labor-intensive. At the same time, there are also problems of poor annotation error and consistency, especially in complex environment, which may cause misjudgment of navigation system and bring security risks.

An existing solution is to annotate pavement elements by using high-precision point cloud data collected by lidar, such as the method and device for annotation point cloud data disclosed in U.S. patent US20180108146A1, a method and device for annotating point cloud data. A specific implementation of the method includes: collecting data in a given scenario by using a laser radar and a non-laser radar sensor to respectively obtain point cloud data and sensor data; segmenting and tracking the point cloud data to obtain point cloud segmentation and tracking results; recognizing and tracking feature objects in the sensor data to obtain feature object recognition and tracking results; correcting the point cloud segmentation and tracking results by using the feature object recognition and tracking results, to obtain confidence levels of the point cloud recognition and tracking results; and determining a point cloud segmentation and tracking result whose confidence level is greater than a confidence level threshold as a point cloud annotation result. However, the processing complexity of point cloud data is large, which requires high hardware equipment for annotators. In addition, due to the characteristics of point cloud data obtained by lidar, the annotator needs to consider X, Y and Z dimensions at the same time in the annotation process, which leads to a lot of time to label and affects the annotation efficiency. In addition, single-frame point cloud data often have occlusion and holes in some areas, which leads to incomplete annotation.

The U.S. invention patent US20180075666A1 discloses a method and a device for processing point cloud data, wherein an obstacle recognition algorithm is used to recognize an object in a point cloud frame to be annotated, and a recognition result is obtained; the recognition result is taken as the initial annotation result of the point cloud frame; the annotation result is updated according to the user's correction operation on the annotation result. However, the above solution still fails to avoid the problem of incomplete annotation.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

In order to solve the problems of high hardware requirements, low annotation efficiency and incomplete annotation when using traditional point cloud data to annotate pavement elements in the prior art, the present invention provides a pavement element annotation method for point cloud data with fusion of height, a device for constructing and pre-annotation point cloud data with fusion of height, an electronic device and a computer-readable storage medium.

In order to achieve the above object, the technical solutions of the present invention are as follows:

a pavement element annotation method for point cloud data with fusion of height, comprising the following steps:

constructing all single-frame point clouds into a joint point cloud in a global coordinate system based on a pose of each frame of single-frame point cloud;

removing dynamic objects in the joint point cloud to obtain a static joint point cloud;

transforming the static joint point cloud into an overhead image;

pre-annotating pavement elements in the overhead image by using a pavement element pre-annotation model;

modifying a pre-annotated result to obtain an overhead image annotation;

establishing a transformational relation between pixels of the overhead image and points of the static joint point cloud based on a ball query algorithm and a ground point algorithm; and transforming the overhead image annotation into a static joint point cloud annotation based on the transformational relation.

On the other hand, the present invention further provides:

a device for constructing and pre-annotation point cloud data with fusion of height, comprising:

a reconstruction module configured for constructing all single-frame point clouds into a joint point cloud in a global coordinate system based on a pose of each frame of single-frame point cloud;

a removing module configured for removing dynamic targets in the joint point cloud to obtain a static joint point cloud;

a first transformation module configured for transforming the static joint point cloud into an overhead image;

a pre-annotation module configured for pre-annotating pavement elements in the overhead image by a pavement element pre-annotation model;

a modifying module configured for modifying a pre-annotated result to obtain an overhead image annotation;

a relation establishing module configured for establishing a transformational relation between pixels of the overhead image and points of the static joint point cloud based on a ball query algorithm and a ground point algorithm; and a second transformation module configured for transforming the overhead image annotation into a static joint point cloud annotation based on the transformational relation.

In another aspect, the present invention further provides: an electronic device comprising:

one or more processors;

a memory for storing one or more programs;

wherein when the one or more programs are executed by the one or more processors, the one or more processors are caused to implement the following method:

constructing all single-frame point clouds into a joint point cloud in a global coordinate system based on a pose of each frame of single-frame point cloud;

removing dynamic objects in the joint point cloud to obtain a static joint point cloud;

transforming the static joint point cloud into an overhead image;

pre-annotating pavement elements in the overhead image by using a pavement element pre-annotation model;

modifying a pre-annotated result to obtain an overhead image annotation;

establishing a transformational relation between pixels of the overhead image and points of the static joint point cloud based on a ball query algorithm and a ground point algorithm; and transforming the overhead image annotation into a static joint point cloud annotation based on the transformational relation.

Compared with the prior art, the present invention has the advantages that the advantages of automatic pre-annotation and manual adjustment are comprehensively utilized, the annotation time is greatly saved, the annotation error is reduced, and the annotation quality is also improved; accurate annotation of pavement elements is helpful to improve the positioning, navigation and obstacle avoidance performance in the fields of automatic driving, robot navigation and so on, thus enhancing the safety and reliability of these systems.

BRIEF DESCRIPTION OF DRAWINGS

In order to explain the technical solutions of this application more clearly, the drawings needed in the implementation will be briefly introduced below. Obviously, the drawings described below are only some implementations of this application. For those skilled in the art, other drawings can be obtained according to these drawings without creative work.

DESCRIPTION OF EMBODIMENTS

In describing the preferred embodiments, specific terminology will be resorted to for the sake of clarity. It is to be understood that each specific term includes all technical equivalents which operate in a similar manner to accomplish a similar purpose.

While various aspects and features of certain embodiments have been summarized above, the following detailed description illustrates a few exemplary embodiments in further detail to enable one skilled in the art to practice such embodiments. Reference will now be made in detail to embodiments of the inventive concept, examples of which are illustrated in the accompanying drawings. The accompanying drawings are not necessarily drawn to scale. The described examples are provided for illustrative purposes and are not intended to limit the scope of the invention. It should be understood, however, that persons having ordinary skill in the art may practice the inventive concept without these specific details.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

As used in the description of the inventive concept and the appended claims, the singular forms "a," "an," and "the" are intended to include the plural forms as well, unless the context clearly indicates other.

Figure 1:
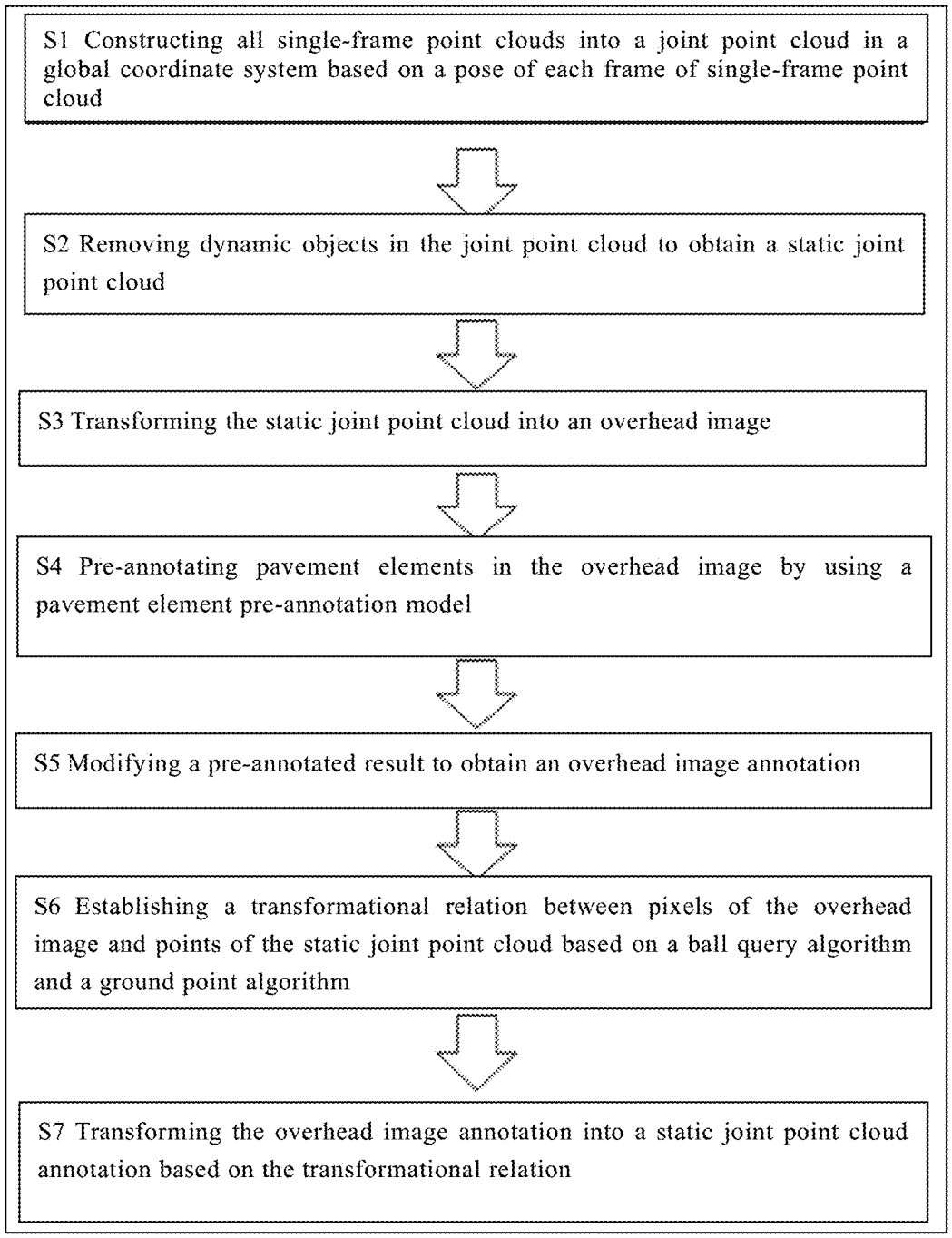
FIG. 1 is a flow chart of a pavement element annotation method for point cloud data with fusion of height provided by an embodiment of the present invention.

FIG. 1 is a flowchart of a pavement element annotation method for point cloud data with fusion of height according to an exemplary embodiment. Referring to FIG. 1, the pavement element annotation method for point cloud data with fusion of height provided by the embodiment of the present invention may include:

S1, all single-frame point clouds are constructed into a joint point cloud in a global coordinate system based on the pose of each frame of single-frame point cloud;

specifically, the pose of each frame of single-frame point cloud consists of a rotation matrix R and a translation vector t:

$[R_{11}, R_{12}, R_{13}, t_1], [R_{21}, R_{22}, R_{23}, t_2], [R_{31}, R_{32}, R_{33}, t_3], [0,0,0,1]$;

For each frame of single-frame point cloud, each point is rotated by the rotation matrix R, and the translation vector t is added to get the new coordinates of each point in the global coordinate system.

Finally, the single-frame point cloud in the global coordinate system of each frame is spliced together to obtain the joint point cloud in the global coordinate system.

S2, the dynamic targets in the joint point cloud are removed to obtain a static joint point cloud;

specifically, the dynamic targets in the joint point cloud can be removed based on a 3D target detection method:

firstly, the joint point cloud is preprocessed, including denoising, filtering and voxelization, to obtain a discrete point cloud representation, so as to improve the accuracy of subsequent dynamic target detection;

a 3D target detection algorithm based on deep learning is used to extract the features in the joint point cloud, generate a feature map, predict the 3D target frame of the dynamic target in the joint point cloud, and also predict the size, direction and tag of the 3D target frame;

the 3D target frames of all the dynamic targets in the joint point cloud predicted by the 3D target detection algorithm are removed by non-maximum suppression, and the preliminary 3D target frames of the dynamic targets are obtained;

finally, a motion model and an object correlation algorithm are used to track the motion trajectory of the object, and the motion state of the object is estimated to optimize the 3D target detection result.

Specifically, the motion model uses a Kalman filtering algorithm, which may include the following sub-steps:

A1: prediction step:

Firstly, a dynamic model of the system is used to predict the state of the next time step, that is, prior estimation. This predicted state will be used as the initial estimate of the next time step. At the same time, the uncertainty of the prior state, namely a covariance matrix, will be predicted.

The specific calculation formula is:

Predicted state estimated value: $X_{prior} = F \times X_{posterior}$

Predicted covariance estimated value: $P_{prior} = F \times P_{posterior} \times F^T + Q$ where X is the state estimation, P is the covariance matrix, F is a state transition matrix, and Q is the process noise covariance matrix.

A2: updating step: the prior estimation is modified, and the estimation is updated by using the observation data, so as to obtain the posterior estimation. In this step, it is necessary to calculate the Kalman gain, which is a weight parameter used to adjust the prediction state.

The specific calculation formula is:

Kalman gain: $K = P_{prior} \times H^T \times (H \times P_{prior} \times H^T + R)^{-1}$ Posterior covariance estimated value: $P_{posterior} = (1 - K \times H) \times P_{prior}$ where H is the observation model matrix, Z is the observation value, R is the observation noise covariance matrix, and I is the identity matrix.

These two steps are carried out alternately, that is, the prediction step is followed by the update step, and then the prediction step, and so on, the final effect is the optimal estimation of the real state of the dynamic target.

The object association algorithm may include the following sub-steps:

B1, the similarity of all dynamic target states is calculated;

B2: the similarity and IOU (Intersection over Union) between the target frames of the dynamic target are combined, wherein the target frames with correlation similarity greater than 0.8 and IOU greater than 0.3 are the same ID, and the target frames that are not correlated are discarded to obtain the optimized target frames of the dynamic targets;

finally, the points in the optimized target frames of the dynamic targets are removed to obtain a static joint point cloud.

A visibility method can also be used to remove the dynamic target in the joint point cloud, that is:

the joint point cloud and all single-frame point clouds are transformed into a depth map and a sub-depth map;

specifically, the focal length of the camera internal reference is defined as $(f_x, f_y)$ and the optical center as $(c_x, c_y)$, and the coordinates (x, y, z) of each point in the point cloud are converted into 2D pixels through the camera internal reference. The specific formula is as follows:

$$u = f_x \times x \div z + c_x$$

$$v = f_y \times y \div z + c_y$$

The distance from the coordinates of each point in the point cloud to the origin (0,0,0) is calculated and normalized the distance to the range of 0-255 as the depth value of the image.

The joint point cloud and all single-frame point clouds are respectively processed in the above way to obtain the depth map corresponding to the joint point cloud and the sub-depth map corresponding to all single-frame point clouds.

The dynamic targets in the point cloud are determined by the depth map and sub-depth map and removed:

specifically, the depth map has the space occupations of dynamic objects at all moments, and all sub-depth maps corresponding to single-frame point clouds have the space occupation of dynamic objects at every moment. By comparing the depth map with the sub-depth maps corresponding to all time series point clouds, if a position has no space occupation at t0 and has space occupation at t1, it is considered that the object occupying space at this position is a dynamic object, and the joint point cloud with the dynamic objects removed is obtained after removing these dynamic objects.

The ground points that are mistakenly removed in the process of removing dynamic targets are recovered.

Specifically, the ground points of the joint point cloud are obtained by the ground point algorithm, and the ground points are combined with the joint point cloud from which the dynamic targets are removed to obtain the joint point cloud after the ground points are restored.

In an embodiment, the ground point algorithm may include the following sub-steps:

A1: the pose of each frame is composed of the coordinate position (x, y, z) and the rotation angle Euler angle (r, p, y) or quaternion (x, y, z, w) of the data acquisition device in each frame, and the point cloud with a fixed radius length is selected as a processing unit according to the pose.

A2: for each processing unit, a vertical normal vector is set in the coordinate system, the plane perpendicular to the normal vector in the processing unit is fitted to the ground, and finally the grounds of all units are combined to obtain the ground points in the joint point cloud.

Removing the dynamic objects in the joint point cloud based on 3D target detection method can completely remove the detected dynamic objects, however, since the 3D target detection algorithm is involved, the objects that have not been trained by the algorithm cannot be detected. Removing the dynamic objects in the joint point cloud based on visibility can detect all the dynamic objects in the point cloud data more robustly, but it cannot completely remove every dynamic object, therefore the two methods are usually combined to ensure that the dynamic objects in the point cloud data are completely removed.

S3: the static joint point cloud is transformed into an overhead image, which may include the following sub-steps:

S31: the length and width of the overhead image are determined based on a minimum of an X-axis coordinate, a maximum of the X-axis coordinate, a minimum of an Y-axis coordinate and a maximum of the Y-axis coordinate in the static joint point cloud, that is, the boundaries of the static joint point cloud;

specifically, the static joint point cloud contains many points, and each point has its own coordinates (x, y, z), which indicates that the position of the point relative to the origin in the three-dimensional coordinate system. By comparing the maximum and minimum values of x and y of each point, the boundaries of the static joint point cloud of the plane composed of the X axis and Y axis can be found. Because the Z axis information is ignored in the overhead image, the differences between the values of boundaries of the static joint point cloud are the length and width of the overhead image.

S32: intensity information of the static joint point cloud from a top view angle is used as image color information for image drawing, and an overhead image of the static joint point cloud is obtained.

Specifically, a matrix with the shape of (W, L, 3) is created according to the length and width of the overhead image, where W is the width of the overhead image, L is the length of the overhead image, and 3 indicates that the final overhead image is 3 channels.

The indexes of the static joint point cloud to the X axis and Y axis of the overhead image are calculated. Because in the coordinate system of the point cloud, the X-axis is upward and the Y-axis is leftward, while in the overhead image coordinate system, the X-axis is rightward and the Y-axis is downward and the origin of the overhead image is in the upper left corner of the overhead image, it is necessary to reverse the coordinate system to correspond to the transformation from the point cloud to the overhead image. The specific calculation method is as follows:

$$y_i = y_{max} - y_p$$

$$x_i = x_p - x_{min}$$

where y is the coordinate on the Y axis of the point that needs to be converted from the static joint point cloud to the overhead image, and $y_{max}$ is the largest y of the static joint point cloud; x is the coordinate on the X axis of the point that needs to be converted from the static joint point cloud to the overhead image, and $x_{min}$ is the smallest x of the static joint point cloud.

After determining the indexes of the static joint point cloud to the X-axis and Y-axis of the overhead image, the RGB values are assigned to the corresponding positions. The RGB values are determined according to the intensity information. First, a color domain with a value of 0-1 is created. The higher the value, the closer the color is to red (255, 0, 0), and the lower the value, the closer the color is to blue (0, 0, 255). Then the intensity value is expanded by the intensity enhancement function to expand the intensity range of the static joint point cloud, and the specific calculation method is as follows:

$$I_e = \text{gamma} \times I^2$$

where, $I_e$ is the enhanced intensity value, gamma is the enhancement coefficient, which is used to control the enhancement amplitude, and I is the incoming original intensity.

Finally, all intensity values are normalized to 0-1 to be acted on the color domain to confirm the color RGB value of this point. The specific normalization method is as follows:

$$I_n = \frac{I_e - I_{min}}{I_{max} - I_{min}}$$

where, $I_n$ is the normalized intensity, $I_{min}$ is the smallest intensity value in the static joint point cloud and Imax is the largest intensity value in the static joint point cloud.

After the color assignment of each position is completed, the matrix is saved as an image to obtain the overhead image of the static joint point cloud. Because the intensity value of each point is enlarged by the intensity enhancement function, the processed static joint point cloud can assign values for colors with lager different, and finally the differences of various regions can be distinguished more clearly the saved image.

S4, pre-annotation is performed on the pavement elements in the overhead image by using a pavement element pre-annotation model;

specifically, firstly, the overhead image is input into a convolutional neural network, and the feature extraction is carried out through the convolutional neural network to extract the 2D scene feature map of the overhead image. A decoder based on DETR (detection transformer) architecture predicts the pavement elements as a set of learnable instances $\{q_i^{ins}\}_{i=1}^{N}$, where N represents the number of instances in the map scene, and each instance represents a pavement element in the scene. The algorithm deals with the features of the overhead image in an instance-based way, which allows multiple pavement elements to be predicted at the same time, that is, the pavement elements can be predicted in a instance-by-instance way, so that the pavement elements can be predicted efficiently and accurately. Finally, pavement elements such as single and double solid lines, dashed lines, backflow lines, variable lane lines, road boundary lines, crosswalks, parking areas and arrows with direction and annotation names are returned, thus reducing the workload of manual annotation and improving the efficiency of pavement element annotation.

S5, the pre-annotated result is modified to obtain an overhead image annotation;

specifically, the annotator modifies the pre-annotation result on the overhead image; compared with the point cloud data, the Z-axis information is removed from the overhead image, therefore the annotator only needs to pay attention to the accuracy of the annotated data in the X-axis and Y-axis during the modification process. For example, when the pavement elements are on the uphill and downhill sections, the annotator needs to pay attention to the z-value change of each point in the point cloud, which is not required in the overhead image, which greatly improves the annotator's modification efficiency.

S6, the transformational relation between the pixels of the overhead image and the points of the static joint point cloud is established based on the ball query algorithm and the ground point algorithm, which may include the following sub-steps:

S61, the ground point of the static joint point cloud is determined by using a ground point algorithm;

specifically, the pose of a single-frame point cloud in each frame is combined into a pose trajectory, and each pose point sets a normal vector perpendicular to the upward direction of the data acquisition vehicle body according to the rotation parameter (Euler angle or quaternion), and a curved surface is fitted according to the pose trajectory and the normal vector of each pose point, and the normal vector of each pose point is perpendicular to the tangent plane of the curved surface, and the height of the curved surface is subtracted by the average height of the data acquisition vehicle of 2m to obtain the approximate ground, and the data of the static joint point cloud are filtered by a RANSAC algorithm in a range of ±1 meter height of the approximate ground, and the ground points are obtained.

S62: the coordinates $(x_i, y_i)$ of a pavement element in the overhead image are transformed into corresponding coordinates in the global coordinate system;

specifically, firstly, it is necessary to reverse the calculation operation in S32, and convert the coordinates $(x_i, y_i)$ of the pavement element in the overhead image into the corresponding coordinates $(x_p, y_p)$ in the global coordinate system. The specific calculation method is as follows:

$$y_p = y_{max} - y_i$$

$$x_p = x_i + x_{min}$$

the coordinates $(x_p, y_p)$ of the pavement element in the global coordinate system are obtained.

S63: the ball query algorithm is used to find a point $(x_g, y_g)$ that is a ground point closest to $(x_p, y_p)$ in the global coordinate system, so as to determine $z_g$, that is, a height of the point of the static joint point cloud, and establish the transformational relation between the pixels of the overhead image and the points of the static joint point cloud.

Specifically, first, the query center and query radius are set, the point $(x_p, y_p)$ is selected as the query center, and a radius of r=5 is set as the query range. All points in the query range are traversed, the distance from each point to the central point is calculated, and a distance list consisting of the distance from each point to the central point is obtained: $[d_1, d_2, d_3, \ldots, d_n]$ the distance list is sorted in an ascending order, whether it belongs to the ground point from the first element in the list is judged, if so, exiting the loop to establish the association between the point $(x_g, y_g, z_g)$ and the pixel point $(x_i, y_i)$ of the overhead image, otherwise continuing to judge the next point.

S7, the overhead image annotation is transformed into a static joint point cloud annotation based on the transformational relation;

specifically, the transformational relation determines the static joint point cloud point $(x_g, y_g, z_g)$ associated with the annotation point $(x_i, y_i)$ of the overhead image, and all the annotation points $(x_i, y_i)$ of the overhead image are transformed from the overhead image to the static joint point cloud to obtain all the static joint point cloud annotations.

Corresponding to the embodiment of the pavement element annotation method for point cloud data with fusion of height, the application also provides an embodiment of a device for constructing and pre-annotating point cloud data wit fusion of height.

Figure 2:
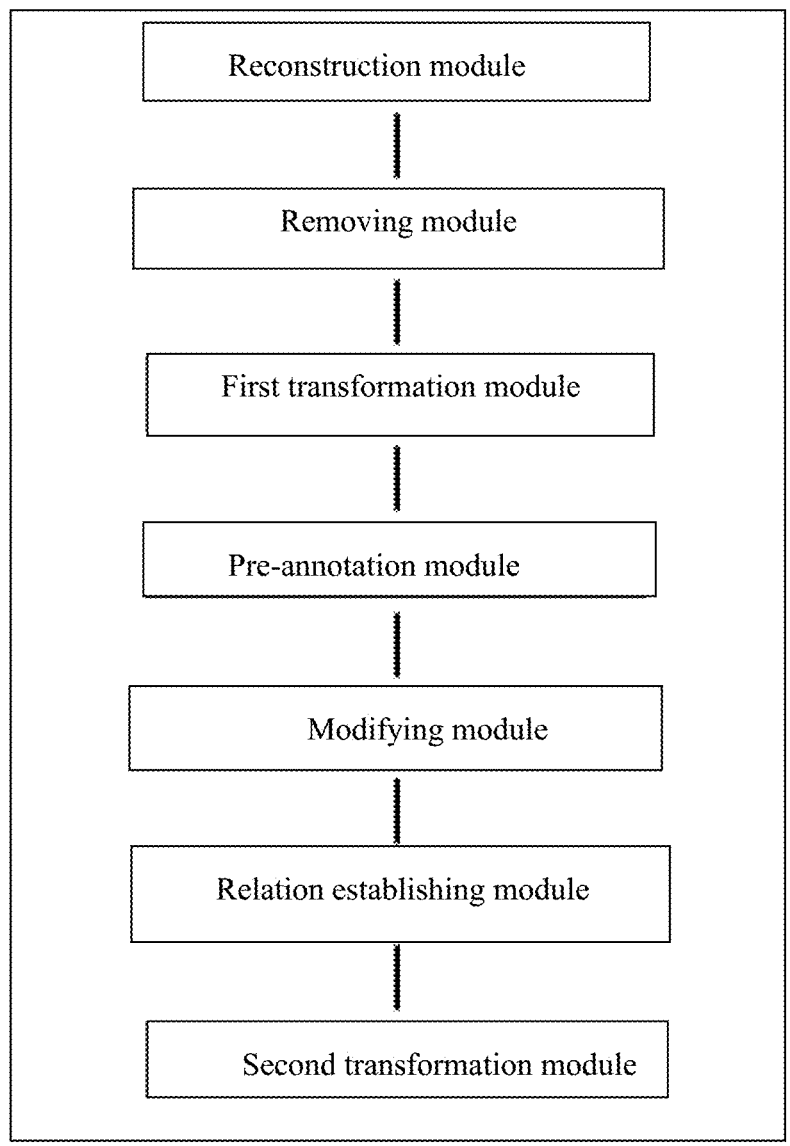
FIG. 2 is a block diagram of a device for constructing and pre-annotating point cloud data with fusion of height provided by an embodiment of the present invention.

FIG. 2 is a block diagram of a device for constructing and pre-annotating point cloud data wit fusion of height according to an exemplary embodiment. Referring to FIG. 2, the device includes:

a reconstruction module configured for constructing all single-frame point clouds into a joint point cloud in a global coordinate system based on a pose of each frame of single-frame point cloud;

a removing module configured for removing dynamic targets in the joint point cloud to obtain a static joint point cloud;

a first transformation module configured for transforming the static joint point cloud into an overhead image;

a pre-annotation module configured for pre-annotating pavement elements in the overhead image by a pavement element pre-annotation model;

a modifying module configured for modifying a pre-annotated result to obtain an overhead image annotation;

a relation establishing module configured for establishing a transformational relation between pixels of the overhead image and points of the static joint point cloud based on a ball query algorithm and a ground point algorithm; and a second transformation module configured for transforming the overhead image annotation into a static joint point cloud annotation based on the transformational relation;

wherein, when device for constructing and pre-annotating point cloud data with fusion of height is used, the pavement element annotation method for point cloud data with fusion of height as described above is realized.

The present invention also provides another technical solution:

an electronic device includes one or more processors; a memory for storing one or more programs. When one or more programs are executed by one or more processors, the one or more processors can realize the pavement element annotation method for point cloud data with fusion of height as described above.

Figure 3:
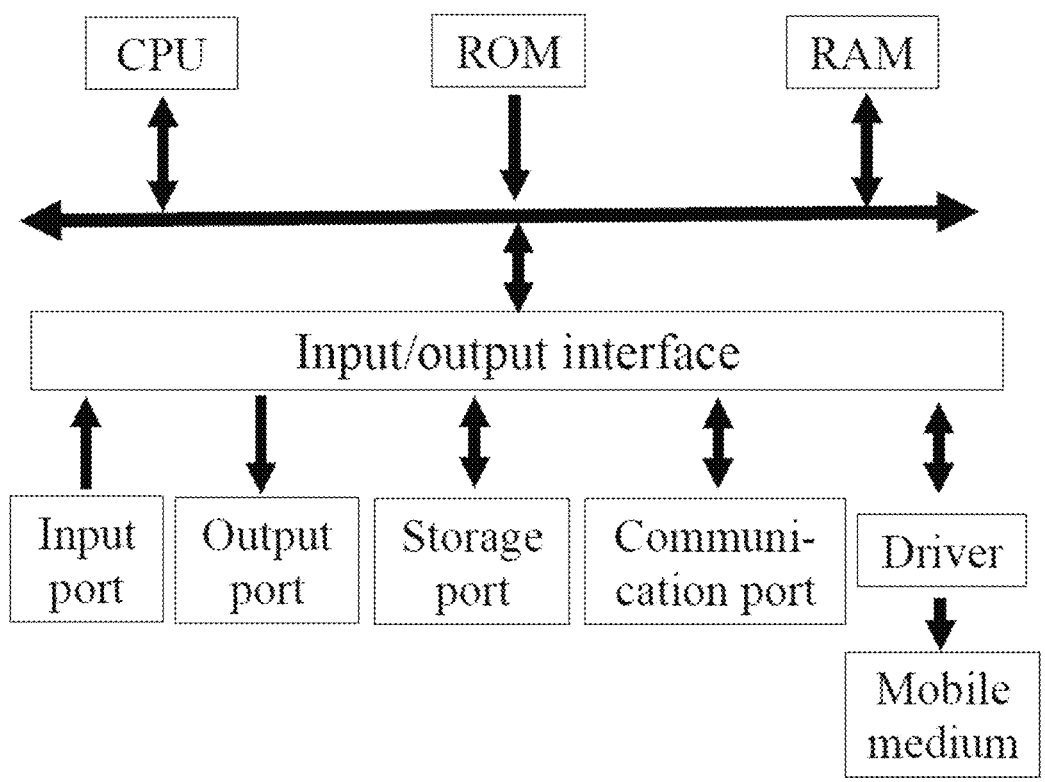
FIG. 3 is a hardware structure diagram of any equipment with data processing capability where the device for constructing and pre-annotating point cloud data with fusion of height provided by the embodiment of the present invention is located.

As shown in FIG. 3, it is a hardware structure diagram of any equipment with data processing capability where the device for constructing and pre-annotating point cloud data wit fusion of height provided by the embodiment of the present invention is located. In addition to the processor and memory shown in FIG. 3, any equipment with data processing capability where the device is located in the embodiment can usually include other hardware according to the actual functions of the equipment with data processing capability, which will not be described here again.

Finally, the present invention also provides another technical solution:

a computer-readable storage medium is stored with computer instructions, which, when executed by a processor, realize the pavement element annotation method for point cloud data with fusion of height as described above. The computer-readable storage medium can be an internal storage unit of any device with data processing capability in any of the aforementioned embodiments, such as a hard disk or a memory. The computer-readable storage medium can also be an external storage device of the wind turbine, such as a plug-in hard disk, Smart Media Card (SMC), SD card, Flash Card, etc. Further, the computer-readable storage medium can also include both internal storage units and external storage devices of any device with data processing capability. Computer-readable storage media are used to store computer programs and other programs and data required by any equipment with data processing capabilities, and can also be used to temporarily store data that has been or will be output.

The technical means disclosed in the scheme of the present invention are not limited to the technical means disclosed in the above embodiments, but also include the technical scheme composed of any combination of the above technical features. It should be pointed out that for those skilled in the art, several improvements and embellishments can be made without departing from the principle of the present invention, and these improvements and embellishments are also regarded as the protection scope of the present invention.

The invention has now been described in detail for the purposes of clarity and understanding. However, those skilled in the art will appreciate that certain changes and modifications may be practiced within the scope of the appended claims.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A pavement element annotation method for point cloud data with fusion of height, comprising the following steps:
constructing all single-frame point clouds into a joint point cloud in a global coordinate system based on a pose of each frame of single-frame point cloud;
removing dynamic objects in the joint point cloud to obtain a static joint point cloud containing a plurality of points, each point having a respective set of coordinates which indicates a position of the point relative to an origin;
transforming the static joint point cloud into a matrix based on the respective coordinates of the plurality of points, wherein the matrix has a width and a length, and saving the matrix as an image, thereby providing an overhead image;
pre-annotating pavement elements in the overhead image by using a pavement element pre-annotation model;
modifying a pre-annotated result to obtain an overhead image annotation;
establishing a transformational relation between pixels of the overhead image and points of the static joint point cloud based on a ball query algorithm and a ground point algorithm; and
transforming the overhead image annotation into a static joint point cloud annotation based on the transformational relation.

2. The pavement element annotation method for point cloud data with fusion of height according to claim 1, wherein the step of removing dynamic objects in the joint point cloud to obtain a static joint point cloud comprises:
removing dynamic targets in the joint point cloud based on a 3D target detection method; or,
removing dynamic objects in the joint point cloud based on a visibility method.

3. The pavement element annotation method for point cloud data with fusion of height according to claim 2, wherein, the 3D target detection method comprises:
calling a 3D target detection model to detect dynamic targets based on the joint point cloud, and obtaining a plurality of different types of target frames;
using a motion model and an object correlation algorithm to track a motion trajectory of an object, and estimating a motion state of the object to optimize a 3D target detection result; finally, removing the points in the target frames of the dynamic targets; wherein,
the dynamic targets comprise vehicles, pedestrians, riders and other targets.

4. The pavement element annotation method for point cloud data with fusion of height according to claim 2, wherein the visibility method comprises:

transforming the joint point cloud and each frame of single-frame point cloud into a depth map and a sub-depth map;

calling the depth map and sub-depth map to judge and remove the dynamic targets in the joint point cloud and each frame of single-frame point cloud; and recovering ground points that are mistakenly removed in the process of removing the dynamic targets.

5. The pavement element annotation method for point cloud data with fusion of height according to claim 1, wherein the step of transforming the static joint point cloud into a matrix comprises:

determining a length and a width of the matrix based on a minimum of an X-axis coordinate, a maximum of the X-axis coordinate, a minimum of a Y-axis coordinate and a maximum of the Y-axis coordinate in the static joint point cloud, that is, the boundaries of the static joint point cloud; and using intensity information of the static joint point cloud from a top view angle as image color information for image drawing, and assigning the image color information to the matrix.

6. The pavement element annotation method for point cloud data with fusion of height according to claim 1, wherein the step of pre-annotating pavement elements in the overhead image by using a pavement element pre-annotation model comprises:

the pavement element pre-annotation model using a convolutional neural network to extract features of the overhead images and generating a 2D scene feature map, and then using an instance-instance transformation mode to predict pavement elements and generating point sequences; wherein, the pavement elements comprise single and double solid lines, dashed lines, backflow lines, variable lane lines, road boundary lines, crosswalks, parking areas and arrows.

7. The pavement element annotation method for point cloud data with fusion of height according to claim 1, wherein, the step of establishing a transformational relation between pixels of the overhead image and points of the static joint point cloud based on a ball query algorithm and a ground point algorithm comprises:

using the ground point algorithm to determine ground points of the static joint point cloud;

transforming the coordinates $(x_i, y_i)$ of a pavement element in the overhead image into corresponding coordinates $(x_p, y_p)$ in the global coordinate system;

using the ball query algorithm to find a point $(x_g, y_g)$ that is a ground point closest to $(x_p, y_p)$ in the global coordinate system, so as to determine $z_g$, that is, a height of the point of the static joint point cloud, and establishing the transformational relation between the pixels of the overhead image and the points of the static joint point cloud.

8. A device for constructing and pre-annotation point cloud data with fusion of height, comprising memory and a processor configured for:

constructing all single-frame point clouds into a joint point cloud in a global coordinate system based on a pose of each frame of single-frame point cloud;

removing dynamic targets in the joint point cloud to obtain a static joint point cloud containing a plurality of points, each point having a respective set of coordinates which indicates a position of the point relative to an origin;

transforming the static joint point cloud into a matrix based on the respective coordinates of the plurality of points, wherein the matrix has a width and a length, and saving the matrix as an image, thereby providing an overhead image;

pre-annotating pavement elements in the overhead image by a pavement element pre-annotation model;

modifying a pre-annotated result to obtain an overhead image annotation;

module configured for establishing a transformational relation between pixels of the overhead image and points of the static joint point cloud based on a ball query algorithm and a ground point algorithm; and transforming the overhead image annotation into a static joint point cloud annotation based on the transformational relation.

9. The device for constructing and pre-annotation point cloud data with fusion of height according to claim 8, wherein removing dynamic objects in the joint point cloud to obtain a static joint point cloud comprises:

removing dynamic targets in the joint point cloud based on a 3D target detection method; or, removing dynamic objects in the joint point cloud based on a visibility method.

10. The device for constructing and pre-annotation point cloud data with fusion of height according to claim 9, wherein the 3D target detection method comprises:

calling a 3D target detection model to detect dynamic targets based on the joint point cloud, and obtaining a plurality of different types of target frames;

using a motion model and an object correlation algorithm to track a motion trajectory of an object, and estimating a motion state of the object to optimize a 3D target detection result; finally, removing the points in the target frames of the dynamic targets; wherein, the dynamic targets comprise vehicles, pedestrians, riders and other targets;

the visibility method comprises:

transforming the joint point cloud and each frame of single-frame point cloud into a depth map and a sub-depth map;

calling the depth map and sub-depth map to judge and remove the dynamic targets in the joint point cloud and each frame of single-frame point cloud; and recovering ground points that are mistakenly removed in the process of removing the dynamic targets.

11. The device for constructing and pre-annotation point cloud data with fusion of height according to claim 8, wherein transforming the static joint point cloud into a matrix comprises:

determining a length and a width of the overhead image based on a minimum of an X-axis coordinate, a maximum of the X-axis coordinate, a minimum of a Y-axis coordinate and a maximum of the Y-axis coordinate in the static joint point cloud, that is, the boundaries of the static joint point cloud; and using intensity information of the static joint point cloud from a top view angle as image color information for image drawing, and assigning the image color information to the matrix.

12. The device for constructing and pre-annotation point cloud data with fusion of height according to claim 8, wherein pre-annotating pavement elements in the overhead image by using a pavement element pre-annotation model comprises:

the pavement element pre-annotation model using a convolutional neural network to extract features of the overhead images and generating a 2D scene feature map, and then using an instance-instance transformation mode to predict pavement elements and generating point sequences; wherein, the pavement elements comprise single and double solid lines, dashed lines, backflow lines, variable lane lines, road boundary lines, crosswalks, parking areas and arrows.

13. The device for constructing and pre-annotation point cloud data with fusion of height according to claim 8, wherein establishing a transformational relation between pixels of the overhead image and points of the static joint point cloud based on a ball query algorithm and a ground point algorithm comprises:

using the ground point algorithm to determine ground points of the static joint point cloud;

transforming the coordinates $(x_i, y_i)$ of a pavement element in the overhead image into corresponding coordinates $(x_p, y_p)$ in the global coordinate system;

using the ball query algorithm to find a point $(x_g, y_g)$ that is a ground point closest to $(x_p, y_p)$ in the global coordinate system, so as to determine $z_g$, that is, a height of the point of the static joint point cloud, and establishing the transformational relation between the pixels of the overhead image and the points of the static joint point cloud.

14. An electronic device comprising:

one or more processors;

a memory for storing one or more programs;

wherein when the one or more programs are executed by the one or more processors, the one or more processors are caused to implement the following method:

constructing all single-frame point clouds into a joint point cloud in a global coordinate system based on a pose of each frame of single-frame point cloud;

removing dynamic objects in the joint point cloud to obtain a static joint point cloud containing a plurality of points, each point having a respective set of coordinates which indicates a position of the point relative to an origin;

transforming the static joint point cloud into a matrix based on the respective coordinates of the plurality of points, wherein the matrix has a width and a length, and saving the matrix as an image, thereby providing an overhead image;

pre-annotating pavement elements in the overhead image by using a pavement element pre-annotation model;

modifying a pre-annotated result to obtain an overhead image annotation;

establishing a transformational relation between pixels of the overhead image and points of the static joint point cloud based on a ball query algorithm and a ground point algorithm; and transforming the overhead image annotation into a static joint point cloud annotation based on the transformational relation.

15. The electronic device according to claim 14, wherein the step of removing dynamic objects in the joint point cloud to obtain a static joint point cloud comprises:

removing dynamic targets in the joint point cloud based on a 3D target detection method; or, removing dynamic objects in the joint point cloud based on a visibility method.

16. The electronic device according to claim 15, wherein the 3D target detection method comprises:

calling a 3D target detection model to detect dynamic targets based on the joint point cloud, and obtaining a plurality of different types of target frames;

using a motion model and an object correlation algorithm to track a motion trajectory of an object, and estimating a motion state of the object to optimize a 3D target detection result; finally, removing the points in the target frames of the dynamic targets; wherein, the dynamic targets comprise vehicles, pedestrians, riders and other targets.

17. The electronic device according to claim 15, wherein the visibility method comprises:

transforming the joint point cloud and each frame of single-frame point cloud into a depth map and a sub-depth map;

calling the depth map and sub-depth map to judge and remove the dynamic targets in the joint point cloud and each frame of single-frame point cloud; and recovering ground points that are mistakenly removed in the process of removing the dynamic targets.

18. The electronic device according to claim 14, wherein the step of transforming the static joint point cloud into a matrix comprises:

determining a length and a width of the overhead image based on a minimum of an X-axis coordinate, a maximum of the X-axis coordinate, a minimum of a Y-axis coordinate and a maximum of the Y-axis coordinate in the static joint point cloud, that is, the boundaries of the static joint point cloud; and using intensity information of the static joint point cloud from a top view angle as image color information for image drawing, and assigning the image color information to the matrix.

19. The electronic device according to claim 14, wherein the step of pre-annotating pavement elements in the overhead image by using a pavement element pre-annotation model comprises:

the pavement element pre-annotation model using a convolutional neural network to extract features of the overhead images and generating a 2D scene feature map, and then using an instance-instance transformation mode to predict pavement elements and generating point sequences; wherein, the pavement elements comprise single and double solid lines, dashed lines, backflow lines, variable lane lines, road boundary lines, crosswalks, parking areas and arrows.

20. The electronic device according to claim 14, wherein the step of establishing a transformational relation between pixels of the overhead image and points of the static joint point cloud based on a ball query algorithm and a ground point algorithm comprises:

using the ground point algorithm to determine ground points of the static joint point cloud;

transforming the coordinates $(x_i, y_i)$ of a pavement element in the overhead image into corresponding coordinates $(x_p, y_p)$ in the global coordinate system;

using the ball query algorithm to find a point $(x_g, y_g)$ that is a ground point closest to $(x_p, y_p)$ in the global coordinate system, so as to determine $z_g$, that is, a height of the point of the static joint point cloud, and establishing the transformational relation between the pixels of the overhead image and the points of the static joint point cloud.

* * * * *